(12) United States Patent
Bauer et al.

(10) Patent No.: US 12,298,197 B2
(45) Date of Patent: May 13, 2025

(54) SYSTEM AND METHOD FOR REDUCING MOTORING TIME IN A TURBOMACHINE BASED ON SHAFT DEFLECTION

(71) Applicant: General Electric Company, Schenectady, NY (US)

(72) Inventors: Bradley Alan Bauer, Cincinnati, OH (US); Brendon Matthew Leeker, Cincinnati, OH (US); Joseph Alfred Iannotti, Glenville, NY (US); Glen Peter Koste, Niskayuna, NY (US); Jason Case, Waterford, NY (US)

(73) Assignee: General Electric Company, Schenectady, NY (US)

( * ) Notice: Subject to any disclaimer, the term of this patent is extended or adjusted under 35 U.S.C. 154(b) by 217 days.

(21) Appl. No.: 18/151,513

(22) Filed: Jan. 9, 2023

(65) Prior Publication Data

US 2024/0230437 A1 Jul. 11, 2024

(51) Int. Cl.
*G01L 3/10* (2006.01)
(52) U.S. Cl.
CPC ...................................... *G01L 3/10* (2013.01)
(58) Field of Classification Search
CPC .......................................................... G01L 3/10
See application file for complete search history.

(56) References Cited

U.S. PATENT DOCUMENTS

| | | | |
|---|---|---|---|
| 4,899,596 A | | 2/1990 | Janik et al. |
| 5,705,757 A | * | 1/1998 | Wozniak ................. G01L 3/108 73/862.28 |
| 8,203,334 B2 | | 6/2012 | Baller et al. |
| 8,820,046 B2 | | 9/2014 | Ross et al. |
| 8,918,264 B2 | | 12/2014 | Jegu et al. |
| 10,174,678 B2 | | 1/2019 | Schwarz et al. |
| 10,443,505 B2 | | 10/2019 | Virtue, Jr. et al. |
| 10,443,507 B2 | | 10/2019 | Schwarz et al. |

(Continued)

FOREIGN PATENT DOCUMENTS

| | | |
|---|---|---|
| CN | 113029582 A | 6/2021 |
| EP | 2006496 A1 | 12/2008 |

OTHER PUBLICATIONS

U.S. Appl. No. 17/524,196, filed Nov. 11, 2021.

(Continued)

*Primary Examiner* — Eric S. McCall
(74) *Attorney, Agent, or Firm* — Smith Gambrell & Russell LLP (57) ABSTRACT

A method for measuring shaft deflection in a turbomachine includes communicating one or more signals from a controller to a plurality of sensing devices positioned on a shaft of a turbomachine across an airgap defined between a rotating antenna positioned around the shaft and a stationary antenna aligned with the rotating antenna in a radial direction to excite the plurality of sensing devices; receiving a parameter of the shaft in a plurality of circumferentially spaced locations from the excited plurality of sensing devices; determining a magnitude of a deflection in the shaft as a function of the parameter of the shaft in the plurality of circumferentially spaced locations; and adjusting a startup sequence or a motoring sequence of the turbomachine based on the magnitude of the deflection.

20 Claims, 10 Drawing Sheets

(56) References Cited

U.S. PATENT DOCUMENTS

| | | | |
|---|---|---|---|
| 10,508,567 B2 | 12/2019 | Stachowiak et al. | |
| 10,508,601 B2 | 12/2019 | Sheridan et al. | |
| 10,605,785 B2 | 3/2020 | Iannotti et al. | |
| 10,724,443 B2 | 7/2020 | Hon et al. | |
| 10,749,612 B1* | 8/2020 | Iannotti | F01D 21/003 |
| 10,787,933 B2 | 9/2020 | Clauson et al. | |
| 10,996,082 B2 | 5/2021 | Iannotti | |
| 12,161,516 B2* | 12/2024 | Yang | A61C 1/052 |
| 2014/0373518 A1 | 12/2014 | Manneville et al. | |
| 2014/0373552 A1 | 12/2014 | Zaccaria et al. | |
| 2014/0373553 A1 | 12/2014 | Zaccaria et al. | |
| 2017/0167287 A1 | 6/2017 | Jacobs et al. | |
| 2017/0234231 A1 | 8/2017 | Virtue, Jr. et al. | |
| 2017/0342855 A1 | 11/2017 | Hon et al. | |
| 2019/0186359 A1 | 6/2019 | Stevenson | |
| 2020/0080475 A1 | 3/2020 | Baladi et al. | |
| 2020/0165976 A1 | 5/2020 | Brown et al. | |
| 2020/0240329 A1 | 7/2020 | Ansari et al. | |
| 2020/0400466 A1* | 12/2020 | Iannotti | G01D 21/00 |

OTHER PUBLICATIONS

Smith et al., A Study of Cranking Effectiveness as a Treatment for Rotor Thermal Bow in Gas Turbines, ISABE-2019-24025, Conference: International Society for Air Breathing Engines Conference 2019, Canberra Australia, Sep. 2019, 12 Pages.

* cited by examiner

SYSTEM AND METHOD FOR REDUCING MOTORING TIME IN A TURBOMACHINE BASED ON SHAFT DEFLECTION

FIELD

The present disclosure relates to turbomachines and, more particularly, to systems and methods for reducing motoring time in a turbomachine based on shaft deflection.

BACKGROUND

Gas turbine engines generally include a turbine section downstream of a combustion section that is rotatable with a compressor section to rotate and operate the gas turbine engine to generate power, such as propulsive thrust. Further, gas turbine engines typically include multiple compressor stages to compress incoming airflow for delivery to the combustion section. Typically, the compressor section defines a high pressure compressor in serial flow arrangement with low pressure compressor. Further, the turbine section generally defines a high pressure turbine in serial flow arrangement with an intermediate pressure turbine and/or low pressure turbine. The high pressure turbine includes an inlet or nozzle guide vane between the combustion section and the high pressure turbine rotor. Conventionally, combustion gases exiting the combustion section define a relatively low velocity compared to a velocity (e.g., along a circumferential or tangential direction) of the first rotating stage of the turbine, generally defined as the high pressure turbine rotor. Thus, the nozzle guide vane serves to accelerate a flow of combustion gases exiting the combustion section to more closely match or exceed the high pressure turbine rotor speed along a tangential or circumferential direction. Such acceleration of flow using a nozzle guide vane to match or exceed high pressure turbine rotor speed is known to improve general engine operability and performance.

Thereafter, conventional turbine sections generally include successive rows or stages of stationary and rotating airfoils, or vanes and blades, respectively. Such configurations generally condition a flow of the combustion gases entering and exiting each stage of vanes and blades.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

The terms "coupled", "fixed", "attached to", and the like refer to both direct coupling, fixing, or attaching, as well as indirect coupling, fixing, or attaching through one or more intermediate components or features, unless otherwise specified herein.

As used herein, the terms "first", "second", "third" and so on may be used interchangeably to distinguish one component from another and are not intended to signify location or importance of the individual components.

The term "adjacent" as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (i.e., a first wall/surface contacting the one or more nonstructural layers, and the one or more nonstructural layers contacting the a second wall/surface).

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

During various stages of operation of gas turbine engines, the rotor blades and compressor casing are exposed to a range of temperatures, such as ground operation, takeoff, and cruise. Such exposure results in thermal expansion or contraction of these compressor components. In particular, upon shut down of the gas turbine engine, uneven cooling of the rotor in the high pressure compressor can result in the upper portion of the shaft being longer than the lower portion, thereby creating a "bow" effect. Thus, the bow effect generally refers to a phenomenon in which the engine centerline rotor bows during a startup sequence of the engine or after engine shutdown (i.e., after engine spool down is complete) due to residual heat within the engine core and the shaft. In some instances, the bow effect may be severe enough to overcome the clearance between the core rotating and stationary components, thereby leading to a rub between the two components if the engine is restarted with a bow present.

Figure 1:
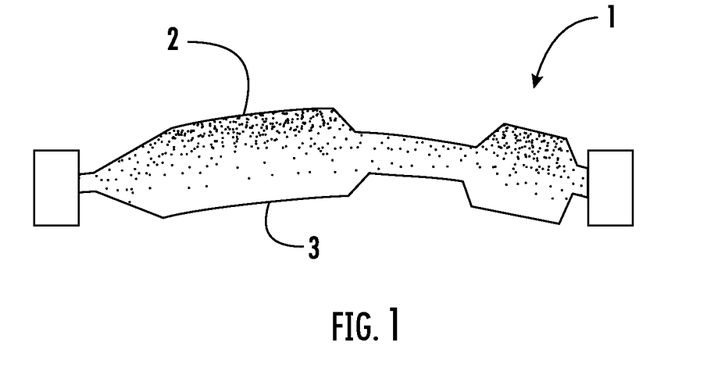
FIG. 1 is a schematic diagram of an embodiment of a rotating assembly, such as a rotor, of a gas turbine engine experiencing a bowing effect according to conventional construction.

For example, FIG. 1 illustrates a schematic diagram of a rotor 1 experiencing the bow effect described herein. In particular, as shown, an upper portion 2 of the rotor 1 is hotter than a lower portion 3 of the rotor 1 (as indicated by the shaded gradient in the rotor 1), such that the upper portion 2 is longer than the lower portion 3. Thus, the rotor 1 is bowed or bent upwards. Such rotor bowing/deformation is undesirable and can cause damage to the gas turbine engine. As such, the present disclosure minimizes the bowing of the rotor, thus, avoiding possible rub-events between the rotor blades and casing. In addition, the present disclosure is configured to reduce the thermal damage to the gas turbine engine, thereby improving the overall life thereof.

As such, the present disclosure is directed to systems and methods for measuring shaft deflection (such as rotor bowing, axial displacement, radial displacement, etc.) in turbomachine, such as a gas turbine engine, using e.g., a plurality of surface wave acoustic (SAW) sensors. By intelligently locating the SAW sensors on the shaft, and prior to engine startup or during engine motoring, the system can measure the strain from the SAW sensors and/or the temperature differential between the SAW sensors on different circumferential locations around the shaft to determine if deflection is present and/or its magnitude. If deflection is present, the system is configured to motor the shaft to reduce the deflection before initiating startup so as to reduce the deflection and to avoid any issues associated therewith.

Figure 2:
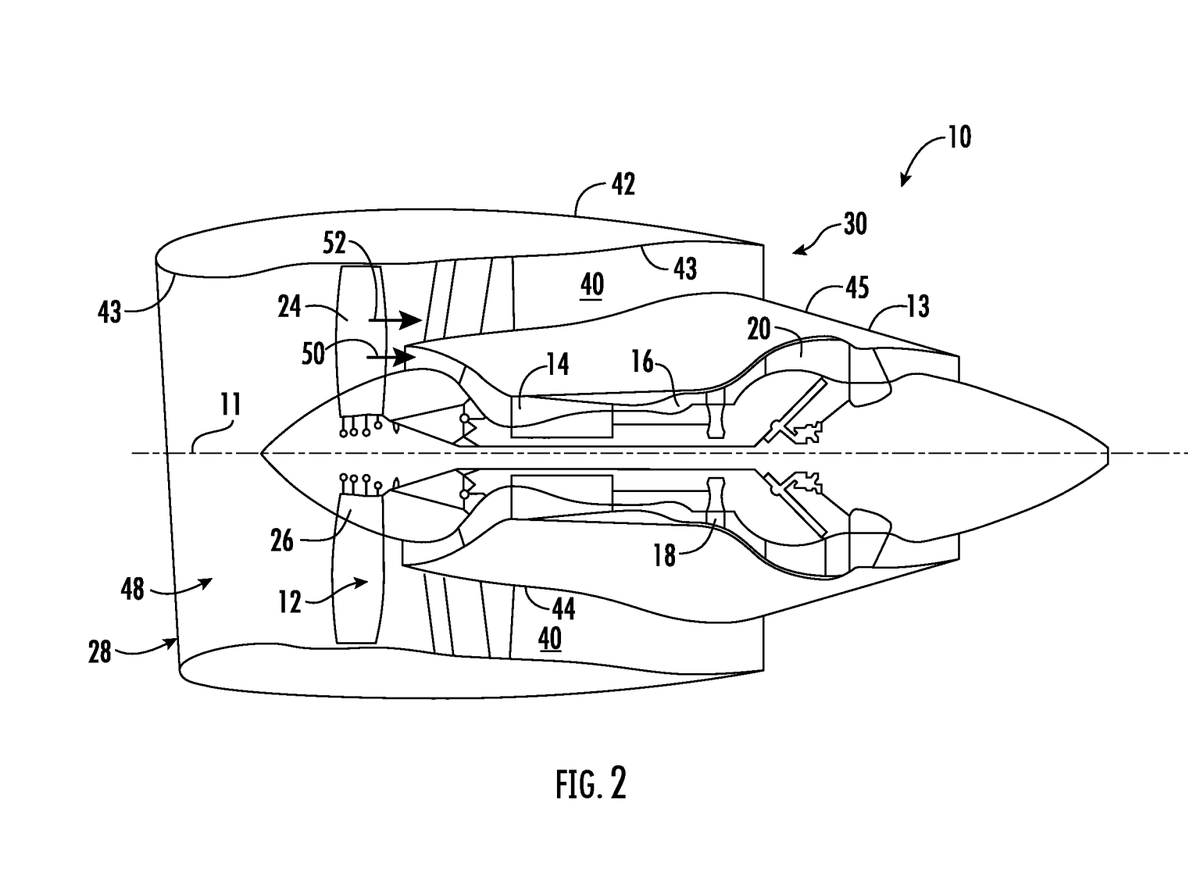
FIG. 2 is a schematic view of an exemplary gas turbine engine according to the present disclosure.

Referring now to the drawings, wherein identical numerals indicate the same elements throughout the figures, FIG. 2 is a schematic illustration of an exemplary gas turbine engine assembly 10 having a longitudinal axis 11. Gas turbine engine assembly 10 includes a fan assembly 12, and a core gas turbine engine 13. Core gas turbine engine 13 includes a high pressure compressor 14, a combustor 16, and a high pressure turbine 18. In the exemplary embodiment, gas turbine engine assembly 10 may also include a low pressure turbine 20. Fan assembly 12 includes an array of fan blades 24 extending radially outward from a rotor disk 26. Engine 10 has an intake side 28 and an exhaust side 30. Gas turbine engine assembly 10 also includes a plurality of bearing assemblies (not shown in FIG. 2) that are utilized to provide rotational and axial support to fan assembly 12, compressor 14, high pressure turbine 18 and low pressure turbine 20, for example.

In operation, an inlet airflow 48 flows through fan assembly 12 and is split by an airflow splitter 44 into a first portion 50 and a second portion 52. First portion 50 of the airflow is channeled through compressor 14 wherein the airflow is further compressed and delivered to combustor 16. Hot products of combustion (not shown in FIG. 2) from combustor 16 are utilized to drive turbines 18 and 20 and thus produce engine thrust. Gas turbine engine assembly 10 also includes a bypass duct 40 that is utilized to bypass a second portion 52 of the airflow discharged from fan assembly 12 around core gas turbine engine 13. More specifically, bypass duct 40 extends between an inner wall 43 of a fan casing or shroud 42 and an outer wall 45 of splitter 44.

Figure 3:
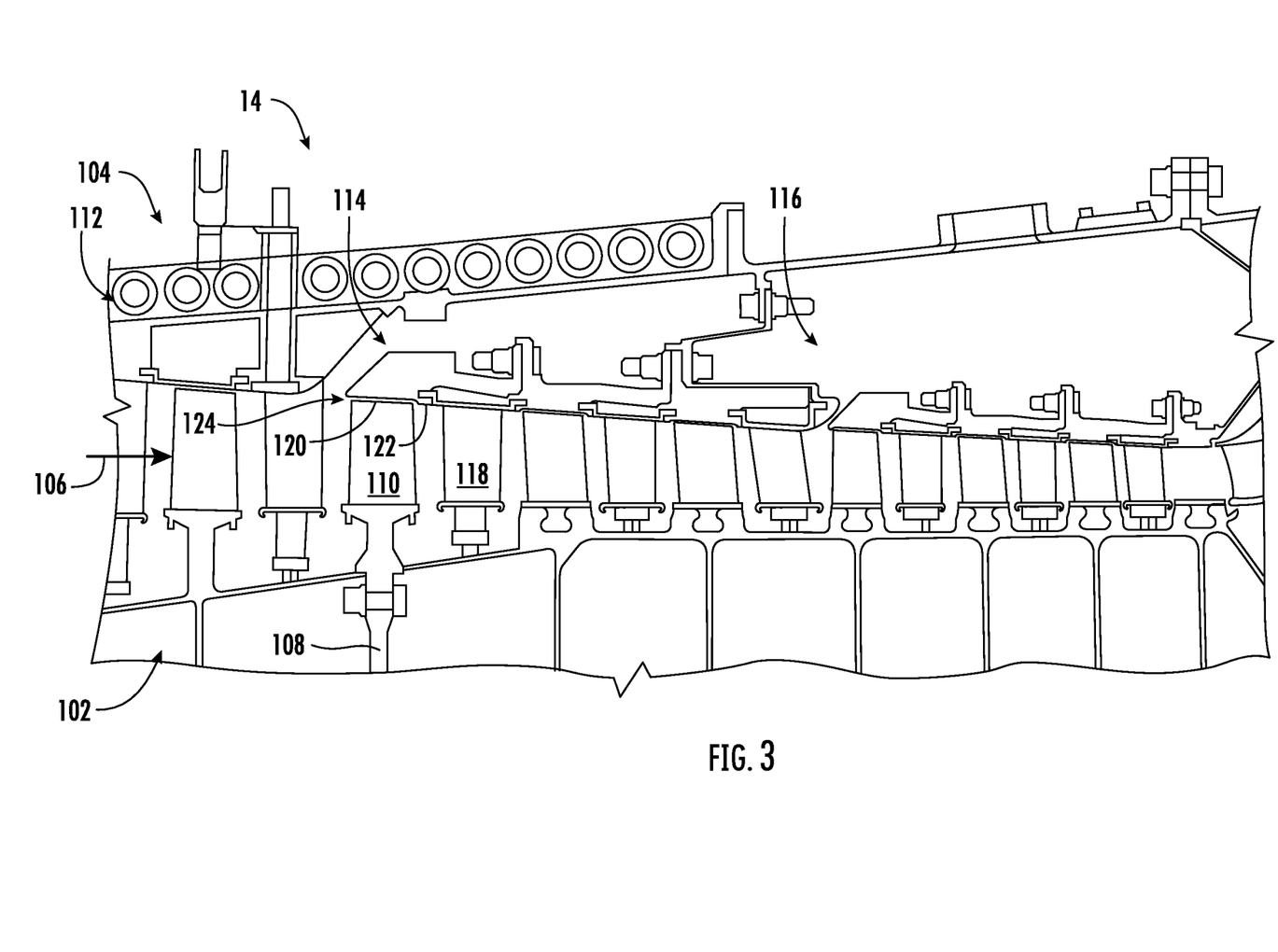
FIG. 3 is a side view of an exemplary compressor that may be used with the gas turbine engine shown in FIG. 2.
Figure 4:
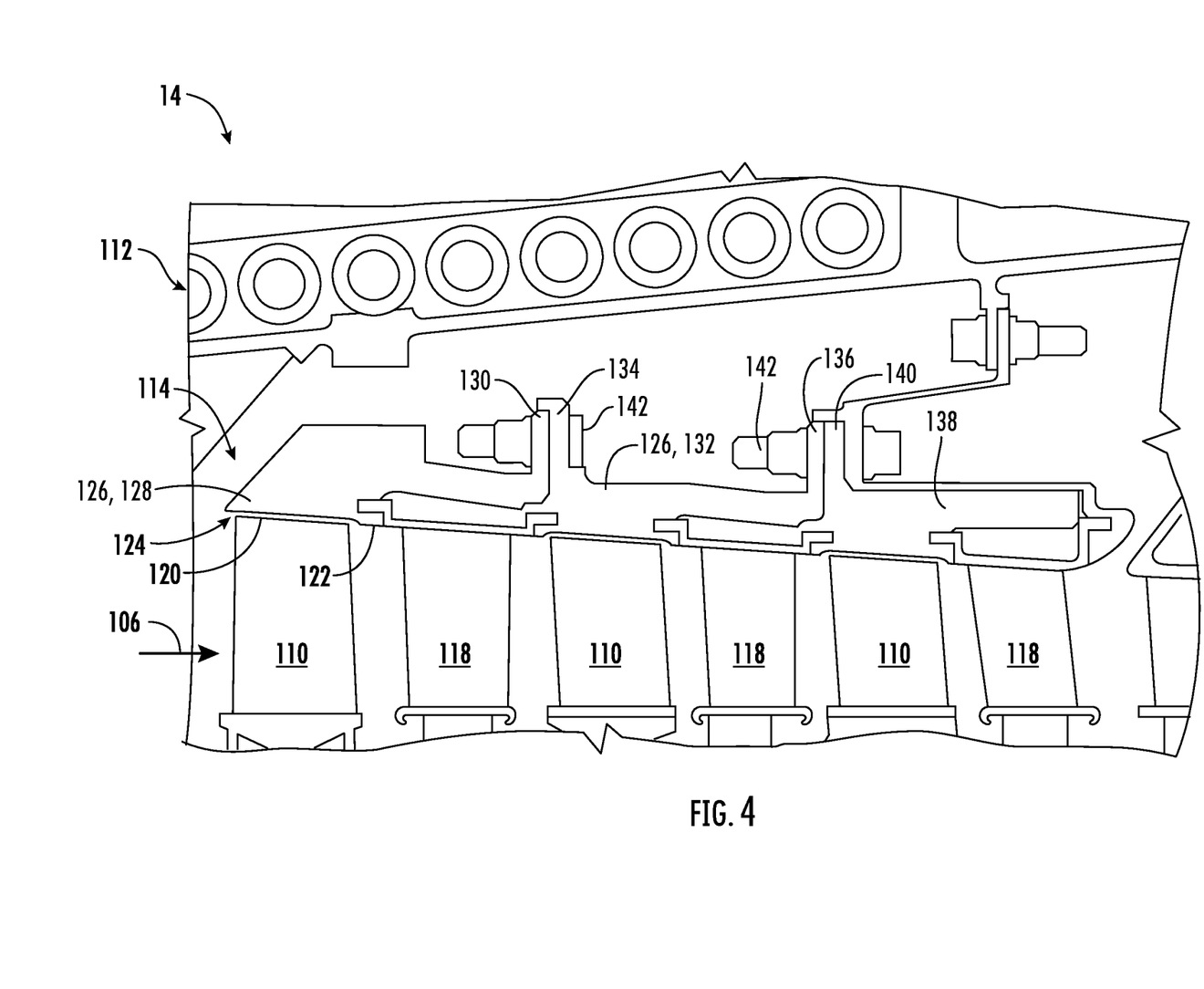
FIG. 4 is an enlarged, side view of a forward portion of an exemplary compressor that may be used with the gas turbine engine shown in FIG. 2.

Referring now to FIGS. 3 and 4, various view of an embodiment of the compressor 14 are illustrated according to the present disclosure. In particular, FIG. 3 illustrates a cross-sectional view of a portion of compressor 14 according to the present disclosure. FIG. 4 is an enlarged view of a forward portion 114 of a compressor casing 112 of the compressor 14 according to the present disclosure. In the exemplary embodiment illustrated in FIGS. 3 and 4, the compressor 14 is a high pressure compressor. Moreover, as shown in FIG. 3, the compressor 14 includes a rotating assembly 102, such as a rotor, and a stationary assembly 104, such as a stator, that are coupled together to define a primary flowpath 106 through compressor 14. Specifically, rotating assembly 102 includes a plurality of rotor disks 108 that each include a rotor blade 110 coupled thereto. Stationary assembly 104 includes a compressor casing 112 having a forward portion 114 and an aft portion 116. Stationary assembly 104 also includes a plurality of stator vanes 118 coupled to casing 112. Compressor 14 includes a plurality of stages, and each stage includes a row of rotor blades 110 and a row of stator vanes 118. In this arrangement, primary flowpath 106 includes a plurality of interdigitated stator vanes 118 and rotor blades 110. In the exemplary embodiment, rotor blades 110 each include a tip portion 120 positioned proximate a radially inner surface 122 of casing 112 such that a gap 124 is defined therebetween.

Further, in the exemplary embodiment, as shown in FIG. 4, the forward portion 114 includes a plurality of rings 126 coupled to one another. More specifically, forward portion 114 includes a first ring 128 including an aft flange 130, a second ring 132 including a forward flange 134 and an aft flange 136, and a third ring 138 including a forward flange 140. In the exemplary embodiment, aft flange 130 of first ring 128 is coupled to forward flange 134 of adjacent second ring 132 via inserting a fastener 142 through aligned openings (not shown) defined in aft flange 130 and forward flange 134. Similarly, aft flange 136 of second ring 132 is coupled to forward flange 140 of adjacent third ring 138 via inserting a fastener 142 through aligned openings (not shown) defined in aft flange 136 and forward flange 140. Although FIG. 4 illustrates forward portion 114 as including three rings 126, forward portion 114 may include any number of rings 126 that facilitates operation of engine assembly 10 as described herein.

Referring now particularly to FIGS. 5A-8, various embodiments of systems and methods of reducing deflection, such as bowing, axial displacement, radial displacement, etc., of a shaft of a turbomachine are provided. As shown particularly in FIGS. 5A-5B, a perspective view of an embodiment of a system 150 for adjusting a startup sequence or a motoring sequence of a turbomachine, such as gas turbine engine assembly 10, to clear a shaft bow according to the present disclosure is illustrated. More specifically, as shown, the shaft 152 may be any shaft in the engine assembly 10, such as a shaft in the fan assembly 12, compressor 14, and so on. Furthermore, it should be understood that the shaft 152 may be rotating shaft of the turbomachine or a static shaft of the turbomachine.

Figure 5A:
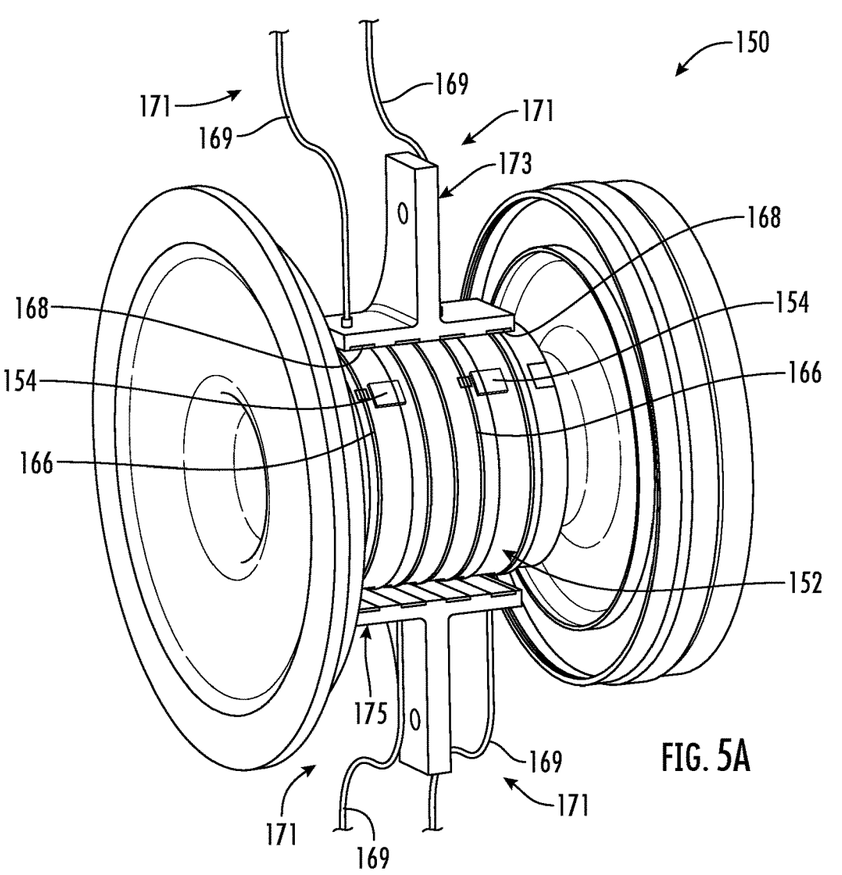
FIG. 5A is a perspective view of an embodiment of a system for measuring shaft deflection in a turbomachine, such as a gas turbine engine, according to the present disclosure.
Figure 5B:
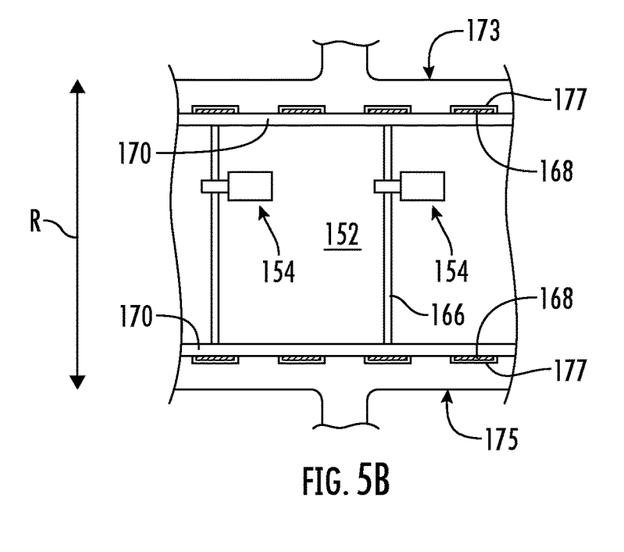
FIG. 5B is a side view of the system for measuring shaft deflection in a turbomachine of FIG. 5A.
Figures 7A, 7B, 7C:
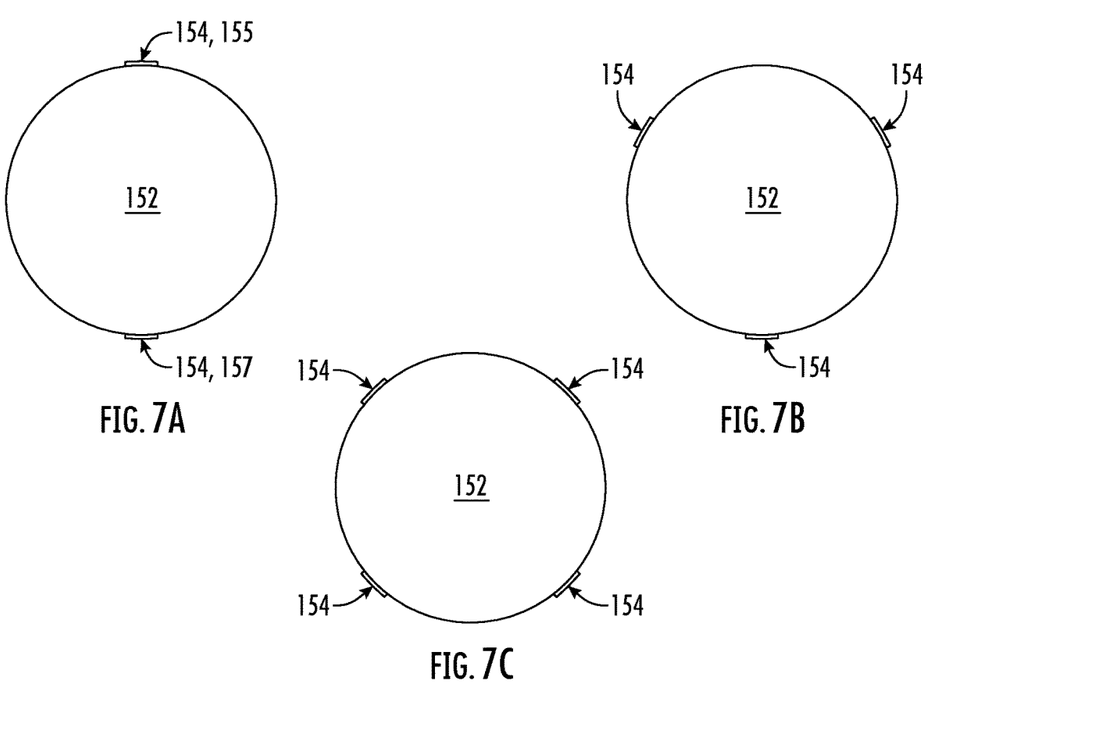
FIGS. 7A-7C illustrate various embodiments of sensor placement for sensing devices of a system for measuring shaft deflection in a turbomachine, such as a gas turbine engine, according to the present disclosure.

Moreover, as shown in FIGS. 5A-5B, the system 150 includes a plurality of sensing devices 154 secured circumferentially around and onto the shaft 152 of the turbomachine. For example, the system 150 may include any suitable number of sensing devices 154 positioned in any suitable arrangement on the shaft 152. For example, FIGS. 7A-7C illustrate various embodiments of different sensor arrangements on the shaft 152. More specifically, FIG. 7A illustrates two sensing devices 154, wherein a first sensing device 155 of the plurality of sensing devices 154 is placed on a first side of the shaft 152 and a second sensing device 157 of the plurality of sensing devices 154 is placed on an opposite, second side of the shaft 152. In another embodiment, as shown in FIG. 7B, the system 150 may include at least three sensing devices 154 arranged around the shaft 152. Moreover, as shown, the three sensing devices 154 may be equally spaced about the shaft 152. In still another embodiment, as shown in FIG. 7C, the system 150 may include at least four sensing devices 154 arranged around the shaft 152. Further, as shown, the four sensing devices 154 may be equally spaced about the shaft 152.

Figure 6:
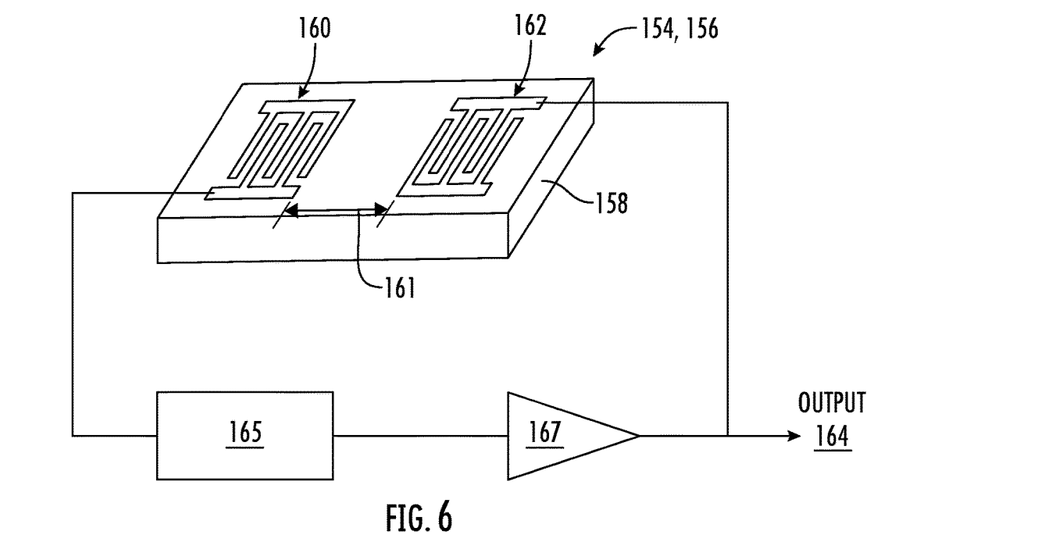
FIG. 6 is a schematic diagram of an embodiment of a sensing device and associated circuitry for measuring shaft deflection in a turbomachine, such as a gas turbine engine, according to the present disclosure.

In additional embodiments, as shown particularly in FIG. 6, the sensing device(s) 154 described herein may include surface wave acoustic (SAW) sensors 156. Thus, in an embodiment, the sensing device(s) 154 may include at least one of one or more devices capable of measuring temperature, one or more devices capable of measuring strain, or combinations thereof. In certain embodiments, for example, one or more of the sensing device(s) 154 may be capable of measuring only strain. In another embodiment, one or more of the sensing device(s) 154 may be capable of measuring strain and temperature. In still further embodiments, the system 150 may include a combination of device(s) which are capable of measuring strain and device(s) which are capable of measuring strain and temperature.

As used herein, the SAW sensors 156 generally rely on the modulation of surface acoustic waves to sense a physical phenomenon. Thus, the SAW sensor(s) 156 described herein is configured to transduce an input electrical signal into a mechanical wave using, e.g., a phase shifter 165 and/or an amplifier 167. As such, unlike an electrical signal, the mechanical wave can be easily influenced by physical phenomena. Accordingly, as shown in FIG. 6, the SAW sensor(s) 156 can then transduce the mechanical wave back into an electrical signal to generate an output 164. Changes in amplitude, phase, frequency, or time-delay between the input and output electrical signals can be used to measure the presence of the desired phenomenon. As such, pressure, strain, torque, a response magnitude to determine a size of the airgap 170, an alignment of the rotating antenna with respect to the stationary antenna, temperature, and mass can be sensed by the SAW sensors 156.

More specifically, as shown particularly in FIG. 6, in an embodiment, the SAW sensor 156 generally includes a piezoelectric substrate 158 with an input interdigitated transducer (IDT) 160 on one side of the surface of the substrate 158 and an output IDT 162 on the other side of the substrate 158. The space between the IDTs 160, 162 across which the surface acoustic wave propagates is known as a delay line 161. The signal produced by the input IDT 160 (i.e., a physical wave) moves much slower than its associated electromagnetic form, causing a measurable delay. As such, the aforementioned phenomena can all cause a change in length along the surface of the SAW sensor 156. A change in length affects both the spacing between the interdigitated electrodes and the spacing between the IDTs 160, 162. This change can be sensed as a phase-shift, frequency-shift, or time-delay in the output 164.

Thus, the sensing devices 154 are configured to sense a parameter of the shaft 152 in a plurality of circumferentially spaced locations. For example, in an embodiment, the parameter of the shaft 152 in the plurality of circumferentially spaced locations may include temperature, strain, frequency, torque, a response magnitude to determine a size of the airgap, an alignment of the rotating antenna with respect to the stationary antenna, or combinations thereof.

Referring still to FIGS. 5A and 5B, the system 150 further includes at least one rotating antenna 166 arranged around the shaft 152. Thus, as shown, the sensing devices 154 are communicatively coupled to the rotating antenna(s) 166. In an embodiment, each of the sensing devices 154 may be coupled to an individual rotating antenna 166. In another embodiment, a subset of the sensing devices 154 may be secured to an individual rotating antenna 166. Thus, the system 150 may include a single rotating antenna 166 or a plurality of rotating antennas 166 arranged around the shaft 152.

Moreover, as shown, the system 150 includes at least one stationary antenna 168 aligned with the rotating antenna 166 in a radial direction. Accordingly, as shown, an airgap 170 is defined between the rotating antenna(s) 166 and the stationary antenna(s) 168. More specifically, as shown in FIGS. 5A and 5B, the rotating antenna(s) 166 and the stationary antenna(s) 168 may be aligned using one or more stationary supports 173, 175. For example, as shown, the system 150 may include a first stationary support 173 mounted adjacent to a first side of the shaft 152 to secure a first set of the stationary antenna(s) 168 in place with respect to the rotating antenna(s) 166. Moreover, as shown, the system 150 may include a second stationary support 175 mounted adjacent to a second side of the shaft 152 to secure a second set of the stationary antenna(s) 168 in place with respect to the rotating antenna(s) 166. In such embodiments, the first and second stationary supports 173, 175 may be mounted adjacent to the shaft 152 using, e.g., one more fasteners (not shown). In addition, as shown, the first and second stationary supports 173, 175 may include one or more recesses 177 configured to receive one of the stationary antennas 168 therein.

Furthermore, in an embodiment, the system 150 also includes a controller 172 communicatively coupled to the plurality of sensing devices 154, such as the SAW sensors 156. For example, as shown in FIG. 5A, the system 150 (and particularly the sensing devices 154) may be coupled to the controller 172 (FIG. 11) via one or more cables, such as a cable harness 169. In such embodiments, the cable harness (es) 169 may be routed through the first and second stationary supports 173, 175 to the controller 172, e.g., such as through one or more through holes in the first and second stationary supports 173, 175.

Moreover, as shown in FIG. 5A, the sensing device(s) 154, the rotating antenna 166, the stationary antenna 168, and the cable harness 169 may be part of a channel 171. Thus, as shown, the system 150 may include a plurality of channels 171, with each channel 171 being communicatively coupled to the controller 172.

Figure 8:
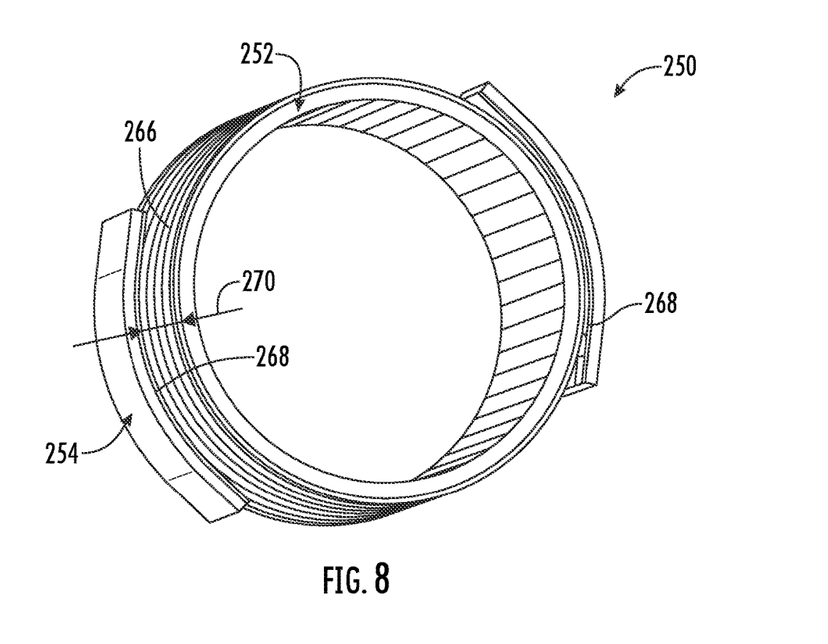
FIG. 8 illustrates a perspective view of another embodiment of a system for measuring shaft deflection in a turbomachine, such as a gas turbine engine, according to the present disclosure.

Referring now to FIG. 8, a perspective view of another embodiment of a system 250 for measuring shaft deflection in a turbomachine, such as a gas turbine engine, according to the present disclosure is illustrated. As shown, the system 250 includes a rotating component 252 and a stationary component 254. Similar to the system 150 described herein, the system 250 also includes at least one rotating antenna 266 and at least one stationary antenna 268. Thus, in the illustrated embodiment, radial displacement (e.g., as represented by a shift or change in the gap 270) of the rotating component 252 will result in an increase in a response magnitude for channels where the rotating component 252 is displaced closer to the stationary antennas 268 on the stationary component 254 and a lower response magnitude for the channels where the rotating component 252 is displaced further away from the stationary antennas 268 on the stationary component 254.

Figure 9:
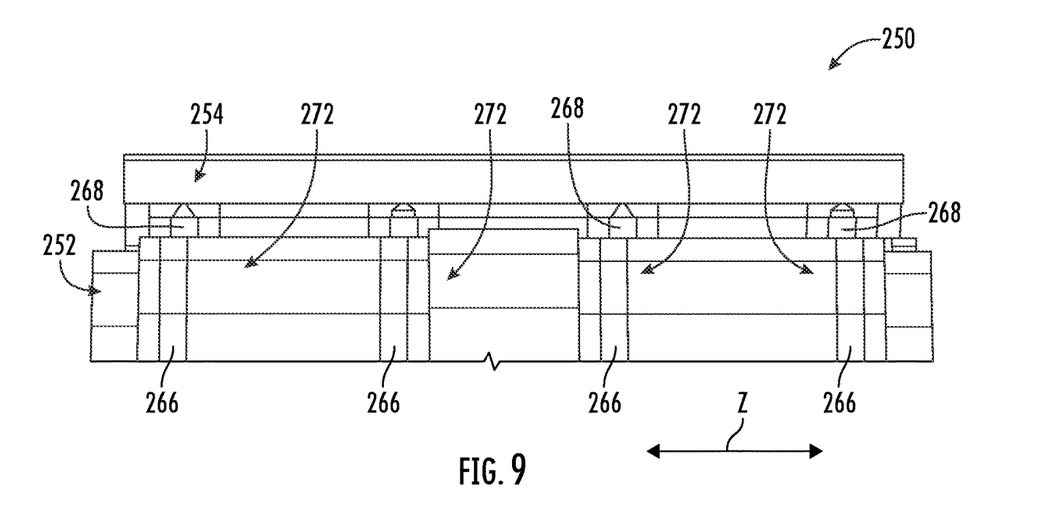
FIG. 9 illustrates a side view of another embodiment of a system for measuring shaft deflection in a turbomachine, such as a gas turbine engine, according to the present disclosure.

Moreover, as shown in FIG. 9, a side view of another embodiment of a system 250 for measuring shaft deflection in a turbomachine, such as a gas turbine engine, according to the present disclosure is illustrated. As shown, the system 250 includes a rotating component 252 and a stationary component 254. In addition, as shown, the system 250 also includes at least one rotating antenna 266 and at least one stationary antenna 268 aligned with the rotating antenna 266, e.g., in a radial direction. In particular, as shown in the illustrated embodiment, the system 250 may include a plurality of channels 272, e.g., such as four channels. Accordingly, as shown, axial deflection of the rotating component 252 can be determined by observing the alignment of the rotating antennas 266 with respect to the stationary antennas 268. For example, when axial displacement is present, the rotating component 252 will be offset with respect to the stationary component 254 in the Z direction. In such embodiments, the rotating component 252 being shifted to the left results in worse coupling on the left three channels (i.e., lower magnitude response) and better coupling (i.e., higher magnitude response) on the right channel because the right channel rotating antenna 252 can be purposefully misaligned.

Figure 10A:
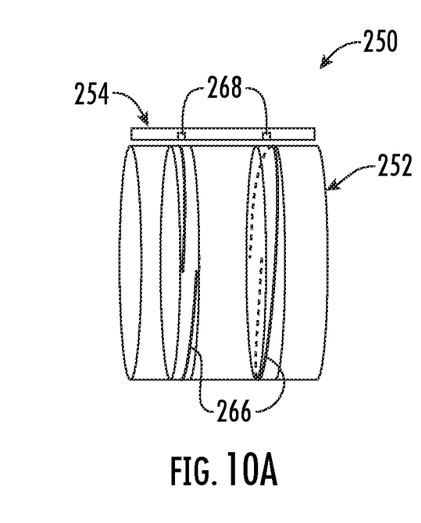
FIGS. 10A-10C illustrate various schematic views of shafts having different antenna designs with offset axial positions along their lengths for measuring shaft deflection in a turbomachine, such as a gas turbine engine, according to the present disclosure.
Figure 10B:
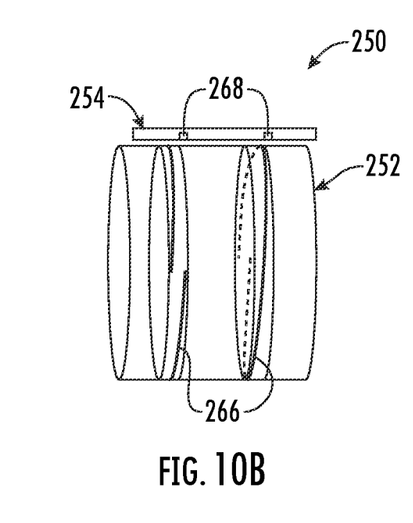
Figure 10C:
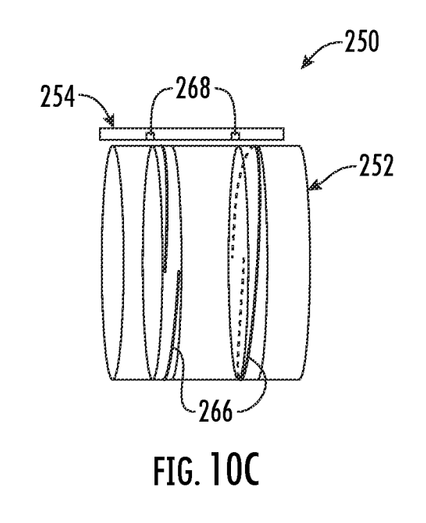

FIGS. 10A-10C illustrate various schematic views of shafts having different antenna designs with offset axial positions along their lengths for measuring shaft deflection in a turbomachine, such as a gas turbine engine, according to the present disclosure. In particular, as shown, the rotating antennas 266 and/or the stationary antennas 268 described herein may include purposeful changes in axial position along their lengths. FIG. 10A illustrates the rotating antennas 266 and the stationary antennas 268 being aligned. FIG. 10B illustrates the rotating antennas 266 and the stationary antennas 268 offset to the left. FIG. 10C illustrates the rotating antennas 266 and the stationary antennas 268 offset to the right.

In such embodiments, as the rotating component 252 rotates, there can be an engineered oscillation in response magnitude. By properly orienting the antennas, this oscillation will be equal and opposite on the two antennas. As the rotating component 252 and the stationary component 254 become misaligned, the oscillation will change. Through analysis of this signature, axial offset, radial offset and bending can be calculated. In such embodiments, the rotating antennas 266 and/or the stationary antennas 268 are configured to provide additional information over a simple straight antenna and can also maintain the average signal level more constant.

Figure 11:
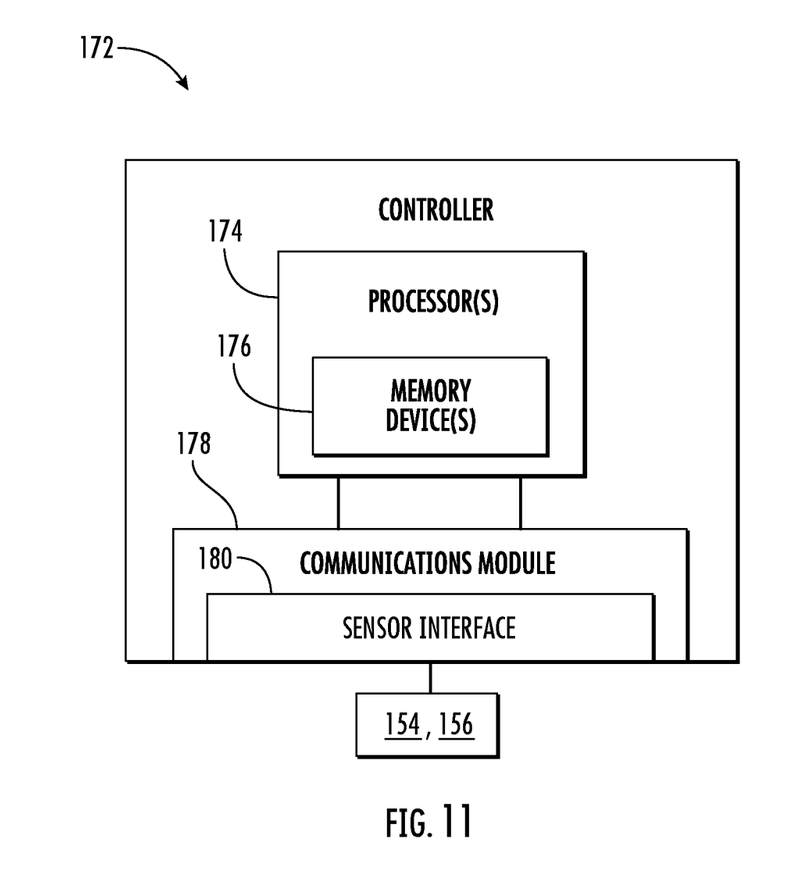
FIG. 11 is a block diagram of an embodiment of a controller of a system for measuring shaft deflection in a turbomachine, such as a gas turbine engine, according to the present disclosure.

Referring particularly to FIG. 11, a block diagram of an embodiment of suitable components that may be included within the controller 172 in accordance with example aspects of the present disclosure is illustrated. As shown, the controller 172 may include one or more processor(s) 174, computer, or other suitable processing unit and associated memory device(s) 176 that may include suitable computer-readable instructions that, when implemented, configure the controller to perform various different functions, such as receiving, transmitting and/or executing engine control signals (e.g., performing the methods, steps, calculations, and the like disclosed herein).

The processor(s) 174 may include a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. The processor(s) 174 may also include a microprocessor, or a combination of the aforementioned devices (e.g., a combination of a DSP and a microprocessor, a plurality of microprocessors, one or more microprocessors in conjunction with a DSP core, or any other such configuration).

Furthermore, as used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 176 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Accordingly, the memory device(s) 176 can store information accessible by processor(s), including instructions that can be executed by processor(s). For example, the instructions can be software or any set of instructions that when executed by the processor(s) 174, cause the processor(s) 174 to perform operations. For certain embodiments, the instructions include a software package configured to operate the system 150 to, e.g., execute the exemplary method 200 described herein.

Additionally, the controller 172 may also include a communications interface 178 to facilitate communications between the controller 172 and the various components of the engine assembly 10 and/or the sensing devices 154. An interface can include one or more circuits, terminals, pins, contacts, conductors, or other components for sending and receiving control signals. Moreover, the controller 172 may include a sensor interface 180 (e.g., one or more analog-to-digital converters) to permit signals transmitted from the various sensors described herein to be converted into signals that can be understood and processed by the processor(s) 174.

Figure 12:
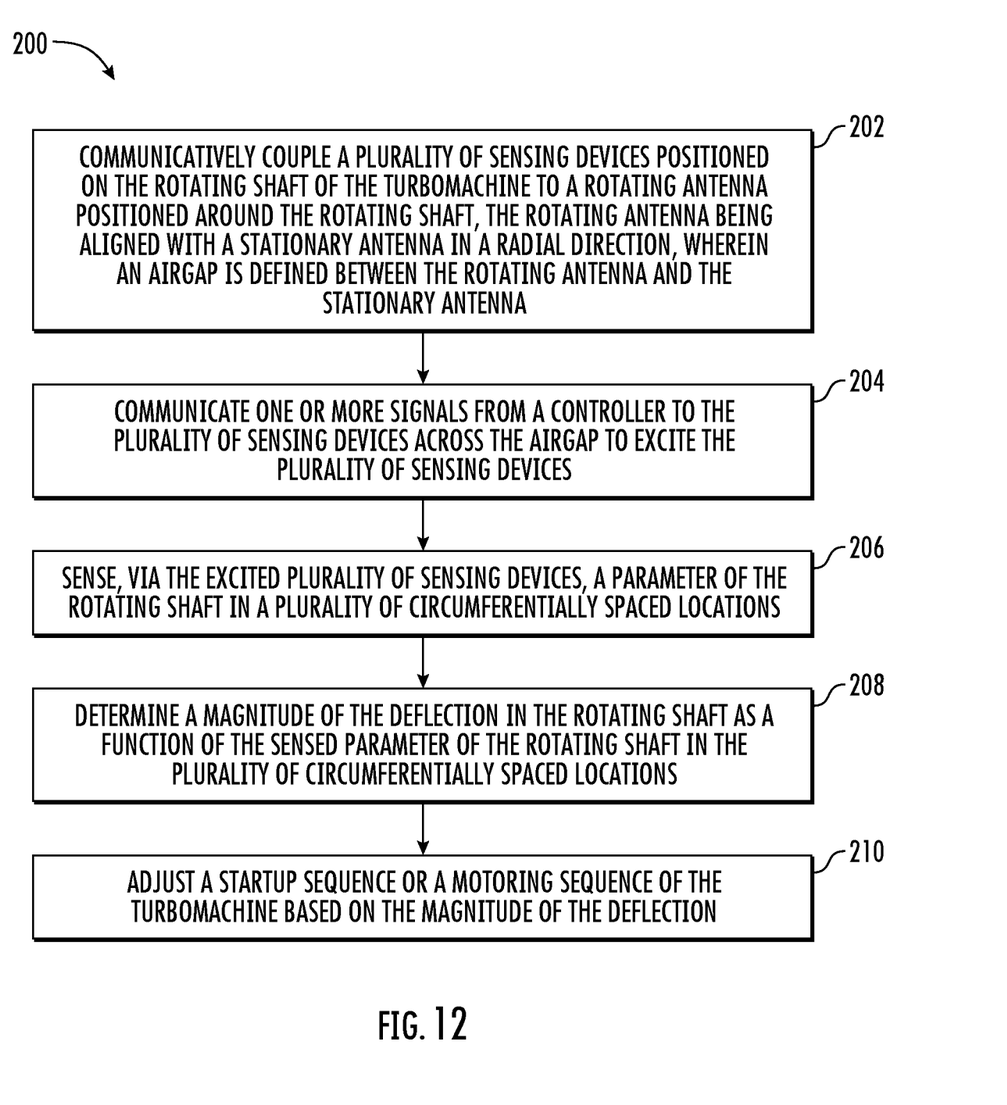
FIG. 12 is a flow chart diagram illustrating a method of adjusting a startup sequence or a motoring sequence of a gas turbine engine to clear a shaft bow according to the present disclosure.

Referring now to FIG. 12, a flow diagram of an embodiment of a method 200 of reducing deflection of a shaft of a turbomachine according to the present disclosure is illustrated. The method 200 described herein is generally explained with reference to the system 150, 250 illustrated in FIGS. 5A-10C, however, it should be understood that the method 200 can be applied to any suitable system having a shaft. Furthermore, it should be appreciated that the method 200 is discussed herein only to describe aspects of the present disclosure and is not intended to be limiting. Further, though FIG. 12 depicts the method 200 having steps performed in a particular order for purposes of illustration and discussion, those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained with respect to the system 150, 250 of FIGS. 5A-10C, as an example, it should be appreciated that these methods may be applied to the operation of any suitable system having any suitable shaft.

In particular, as shown at (202), the method 200 includes communicatively coupling the plurality of sensing devices positioned on the shaft to the rotating antenna positioned around the shaft. As explained herein, the rotating antenna 166 is aligned with the stationary antenna in a radial direction such that the airgap is defined between the rotating antenna and the stationary antenna. Thus, as shown at (204), the method 200 includes communicating one or more signals from the controller to the plurality of sensing devices across the airgap to excite the plurality of sensing devices. For example, in an embodiment, communicating the signal(s) from the controller to the plurality of sensing devices may include communicating the signal(s) from the controller to the plurality of sensing devices through the cable harness.

As shown at (206), the method 200 includes sensing, via the excited plurality of sensing devices, a parameter of the shaft in a plurality of circumferentially spaced locations. As shown at (208), the method 200 includes determining a magnitude of the deflection in the shaft as a function of the sensed parameter of the shaft in the plurality of circumferentially spaced locations. As shown at (210), the method 200 includes adjusting a startup sequence or a motoring sequence of the turbomachine based on the magnitude of the deflection. For example, in an embodiment, adjusting the startup sequence or the motoring sequence of the turbomachine based on the magnitude of the deflection may include determining an amount of time to motor the shaft to reduce the deflection before initiating the startup sequence or the motoring sequence of the turbomachine, motoring the shaft for the determined amount of time, verifying whether the deflection has been reduced by a certain amount, and initiating the startup sequence or the motoring sequence of the turbomachine when the deflection has been reduced by the certain amount.

In further embodiments, as previously mentioned, the method 200 may include placing a first sensing device of the plurality of sensing devices on a first side of the shaft and placing a second sensing device of the plurality of sensing devices on an opposite, second side of the shaft. Thus, in such embodiments, the method 200 may include determining whether one of the first or second sensing devices is in compression and the other of the first or second sensing devices is in tension.

Further aspects are provided by the subject matter of the following clauses:

A method, comprising: communicating one or more signals from a controller to a plurality of sensing devices positioned on a shaft of a turbomachine across an airgap defined between a rotating antenna positioned around the shaft and a stationary antenna aligned with the rotating antenna in a radial direction to excite the plurality of sensing devices; receiving a parameter of the shaft in a plurality of circumferentially spaced locations from the excited plurality of sensing devices; determining a magnitude of a deflection in the shaft as a function of the parameter of the shaft in the plurality of circumferentially spaced locations; and adjusting a startup sequence or a motoring sequence of the turbomachine based on the magnitude of the deflection.

The method of any preceding clause, wherein the plurality of sensing devices comprise one of surface wave acoustic (SAW) sensors, strain gauges, or temperature sensors.

The method of any preceding clause, wherein the plurality of sensing devices comprises at least one of one or more temperature sensing devices, one or more strain sensing devices, one or more torque sensing devices, or combinations thereof, and wherein the parameter of the shaft in the plurality of circumferentially spaced locations comprises at least one of temperature, strain, frequency, torque, a response magnitude to determine a size of the airgap, an alignment of the rotating antenna with respect to the stationary antenna, or combinations thereof.

The method of any preceding clause, further comprising placing a first sensing device of the plurality of sensing devices on a first side of the shaft and placing a second sensing device of the plurality of sensing devices on an opposite, second side of the shaft.

The method of any preceding clause, wherein one of the first sensing device or the second sensing device is a capable of measuring strain and the other of the first sensing device or the second sensing device is capable of measuring temperature and strain.

The method of any preceding clause, further comprising determining whether one of the first sensing device or the second sensing device is in compression and the other of the first sensing device or the second sensing device is in tension.

The method of any preceding clause, wherein the plurality of sensing devices comprises at least three sensing devices equally spaced around a circumference of the shaft.

The method of any preceding clause, wherein the plurality of sensing devices comprises at least four sensing devices equally spaced around the circumference of the shaft.

The method of any preceding clause, wherein communicating the one or more signals from the controller to the plurality of sensing devices across the airgap to excite the plurality of sensing devices further comprises communicating the one or more signals from the controller to the plurality of sensing devices through a cable harness.

The method of any preceding clause, wherein the plurality of sensing devices, the rotating antenna, the stationary antenna, and the cable harness are part of a channel, the controller communicatively coupled to a plurality of channels.

The method of any preceding clause, further comprising:
mounting a stationary support adjacent to the shaft to secure the stationary antenna in place with respect to the rotating antenna; and
routing the cable harness through the stationary support and to the controller.

The method of any preceding clause, wherein adjusting the startup sequence or the motoring sequence of the turbomachine based on the magnitude of the deflection further comprises: determining an amount of time to motor the shaft to reduce the deflection before initiating the startup sequence or the motoring sequence of the turbomachine; motoring the shaft for the determined amount of time; verifying whether the deflection has been reduced by a certain amount; and initiating the startup sequence or the motoring sequence of the turbomachine when the deflection has been reduced by the certain amount.

The method of any preceding clause, wherein the deflection comprises bowing of the shaft, axial displacement, or radial displacement.

A system, comprising: a plurality of sensing devices secured circumferentially around and onto a shaft of a turbomachine, the plurality of sensing devices configured to sense a parameter of the shaft in a plurality of circumferentially spaced locations; a rotating antenna arranged around the shaft, wherein the plurality of sensing devices is communicatively coupled to the rotating antenna; a plurality of stationary antennas on the same or opposing sides of the shaft and aligned with the rotating antenna or intentionally offset from the rotating antenna to vary a magnitude of the parameter, wherein an airgap is defined between the rotating antenna and the plurality of stationary antennas; and a controller communicatively coupled to the plurality of sensing devices, the controller comprising at least one processor, the at least one processor configured to perform a plurality of operations, the plurality of operations comprising: communicating one or more signals to the plurality of sensing devices across the airgap to excite the plurality of sensing devices; determining a magnitude of a deflection in the shaft as a function of the sensed parameter of the shaft in the plurality of circumferentially spaced locations; and adjusting a startup sequence or a motoring sequence of the turbomachine based on the magnitude of the deflection.

The system of any preceding clause, wherein the plurality of sensing devices comprise a plurality of surface wave acoustic (SAW) sensors, wherein the plurality of SAW sensors comprises at least one of one or more temperature sensing devices, one or more strain sensing devices, one or more torque sensing devices, or combinations thereof, and wherein the parameter of the shaft in the plurality of circumferentially spaced locations comprises at least one of temperature, strain, frequency, torque, a response magnitude to determine a size of the airgap, an alignment of the rotating antenna with respect to the stationary antenna, or combinations thereof.

The system of any preceding clause, wherein a first sensing device of the plurality of sensing devices is placed on a first side of the shaft and a second sensing device of the plurality of sensing devices is placed on an opposite, second side of the shaft, and wherein one of the first sensing device or the second sensing device is capable of measuring strain and temperature and the other of the first sensing device or the second sensing device is only capable of measuring strain, the plurality of operations further comprising: determining whether one of the first or second sensing devices is in compression and the other of the first or second sensing devices is in tension.

The system of any preceding clause, wherein the plurality of sensing devices comprises at least three sensing devices equally spaced around a circumference of the shaft.

The system of any preceding clause, wherein the plurality of sensing devices comprises at least four sensing devices equally spaced around the circumference of the shaft.

The system of any preceding clause, wherein communicating the one or more signals from the controller to the plurality of sensing devices across the airgap to excite the plurality of sensing devices further comprises communicating the one or more signals from the controller to the plurality of sensing devices through a cable harness.

The system of any preceding clause, wherein the plurality of sensing devices, the rotating antenna, the stationary antenna, and the cable harness are part of a channel, the system comprising a plurality of channels.

A controller communicatively coupled to a plurality of sensing devices positioned on a shaft of a turbomachine and a rotating antenna positioned around the shaft. The rotating antenna is aligned with a stationary antenna in a radial direction and an airgap is defined between the rotating antenna and the stationary antenna. The controller comprising a processor configured to perform a plurality of operations. The plurality of operations comprise: communicating one or more signals to the plurality of sensing devices across the airgap to excite the plurality of sensing devices; receiving a parameter of the shaft in a plurality of circumferentially spaced locations from the excited plurality of sensing devices; determining a magnitude of a deflection in the shaft as a function of the sensed parameter of the shaft in the plurality of circumferentially spaced locations; and adjusting a startup sequence or a motoring sequence of the turbomachine based on the magnitude of the deflection.

A computer readable medium, comprising a processor configured for: communicating one or more signals to a plurality of sensing devices positioned on a shaft of a turbomachine across an airgap defined between a rotating antenna positioned around the shaft and a stationary antenna aligned with the rotating antenna in a radial direction to excite the plurality of sensing devices, receiving a parameter of the shaft in a plurality of circumferentially spaced locations from the excited plurality of sensing devices; determining a magnitude of a deflection in the shaft as a function of the sensed parameter of the shaft in the plurality of circumferentially spaced locations; and adjusting a startup sequence or a motoring sequence of the turbomachine based on the magnitude of the deflection.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A method, comprising:
   communicating one or more signals from a controller to a plurality of sensing devices positioned on a shaft of a turbomachine across an airgap defined between a rotating antenna positioned around the shaft and a stationary antenna aligned with the rotating antenna in a radial direction to excite the plurality of sensing devices;
   receiving a parameter of the shaft in a plurality of circumferentially spaced locations from the excited plurality of sensing devices;
   determining a magnitude of a deflection in the shaft as a function of the parameter of the shaft in the plurality of circumferentially spaced locations; and
   adjusting a startup sequence or a motoring sequence of the turbomachine based on the magnitude of the deflection.

2. The method of claim 1, wherein the plurality of sensing devices comprise one of surface wave acoustic (SAW) sensors, strain gauges, or temperature sensors.

3. The method of claim 1, wherein the plurality of sensing devices comprises at least one of one or more temperature sensing devices, one or more strain sensing devices, one or more torque sensing devices, or combinations thereof, and wherein the parameter of the shaft in the plurality of circumferentially spaced locations comprises at least one of temperature, strain, frequency, torque, a response magnitude to determine a size of the airgap, an alignment of the rotating antenna with respect to the stationary antenna, or combinations thereof.

4. The method of claim 1, further comprising placing a first sensing device of the plurality of sensing devices on a first side of the shaft and placing a second sensing device of the plurality of sensing devices on an opposite, second side of the shaft.

5. The method of claim 4, wherein one of the first sensing device or the second sensing device is a capable of measuring strain and the other of the first sensing device or the second sensing device is capable of measuring temperature and strain.

6. The method of claim 4, further comprising determining whether one of the first sensing device or the second sensing device is in compression and the other of the first sensing device or the second sensing device is in tension.

7. The method of claim 1, wherein the plurality of sensing devices comprises at least three sensing devices equally spaced around a circumference of the shaft.

8. The method of claim 7, wherein the plurality of sensing devices comprises at least four sensing devices equally spaced around the circumference of the shaft.

9. The method of claim 1, wherein communicating the one or more signals from the controller to the plurality of sensing devices across the airgap to excite the plurality of sensing devices further comprises communicating the one or more signals from the controller to the plurality of sensing devices through a cable harness.

10. The method of claim 9, wherein the plurality of sensing devices, the rotating antenna, the stationary antenna, and the cable harness are part of a channel, the controller communicatively coupled to a plurality of channels.

11. The method of claim 9, further comprising:
    mounting a stationary support adjacent to the shaft to secure the stationary antenna in place with respect to the rotating antenna; and
    routing the cable harness through the stationary support and to the controller.

12. The method of claim 1, wherein adjusting the startup sequence or the motoring sequence of the turbomachine based on the magnitude of the deflection further comprises:
    determining an amount of time to motor the shaft to reduce the deflection before initiating the startup sequence or the motoring sequence of the turbomachine;
    motoring the shaft for the determined amount of time;
    verifying whether the deflection has been reduced by a certain amount; and
    initiating the startup sequence or the motoring sequence of the turbomachine when the deflection has been reduced by the certain amount.

13. The method of claim 1, wherein the deflection comprises at least one of bowing of the shaft, axial displacement, or radial displacement.

14. A system, comprising:
    a plurality of sensing devices secured circumferentially around and onto a shaft of a turbomachine, the plurality of sensing devices configured to sense a parameter of the shaft in a plurality of circumferentially spaced locations;
    a rotating antenna arranged around the shaft, wherein the plurality of sensing devices is communicatively coupled to the rotating antenna;
    a plurality of stationary antennas on the same or opposing sides of the shaft and aligned with the rotating antenna or intentionally offset from the rotating antenna to vary a magnitude of the parameter, wherein an airgap is defined between the rotating antenna and the plurality of stationary antennas; and a controller communicatively coupled to the plurality of sensing devices, the controller comprising at least one processor, the at least one processor configured to perform a plurality of operations, the plurality of operations comprising:

communicating one or more signals to the plurality of sensing devices across the airgap to excite the plurality of sensing devices;

determining a magnitude of a deflection in the shaft as a function of the sensed parameter of the shaft in the plurality of circumferentially spaced locations; and adjusting a startup sequence or a motoring sequence of the turbomachine based on the magnitude of the deflection.

15. The system of claim 14, wherein the plurality of sensing devices comprise a plurality of surface wave acoustic (SAW) sensors, wherein the plurality of SAW sensors comprises at least one of one or more temperature sensing devices, one or more strain sensing devices, one or more torque sensing devices, or combinations thereof, and wherein the parameter of the shaft in the plurality of circumferentially spaced locations comprises at least one of temperature, strain, frequency, torque, a response magnitude to determine a size of the airgap, an alignment of the rotating antenna with respect to the stationary antenna, or combinations thereof.

16. The system of claim 14, wherein a first sensing device of the plurality of sensing devices is placed on a first side of the shaft and a second sensing device of the plurality of sensing devices is placed on an opposite, second side of the shaft, and wherein one of the first sensing device or the second sensing device is capable of measuring strain and temperature and the other of the first sensing device or the second sensing device is only capable of measuring strain, the plurality of operations further comprising:

determining whether one of the first or second sensing devices is in compression and the other of the first or second sensing devices is in tension.

17. The system of claim 14, wherein the plurality of sensing devices comprises at least three sensing devices equally spaced around a circumference of the shaft.

18. The system of claim 17, wherein the plurality of sensing devices comprises at least four sensing devices equally spaced around the circumference of the shaft.

19. The system of claim 14, wherein communicating the one or more signals from the controller to the plurality of sensing devices across the airgap to excite the plurality of sensing devices further comprises communicating the one or more signals from the controller to the plurality of sensing devices through a cable harness.

20. A controller communicatively coupled to a plurality of sensing devices positioned on a shaft of a turbomachine and a rotating antenna positioned around the shaft, the rotating antenna being aligned with a stationary antenna in a radial direction, wherein an airgap is defined between the rotating antenna and the stationary antenna, the controller configured comprising a processor configured to perform a plurality of operations, the plurality of operations comprising:

communicating one or more signals to the plurality of sensing devices across the airgap to excite the plurality of sensing devices;

receiving a parameter of the shaft in a plurality of circumferentially spaced locations from the excited plurality of sensing devices;

determining a magnitude of a deflection in the shaft as a function of the sensed parameter of the shaft in the plurality of circumferentially spaced locations; and adjusting a startup sequence or a motoring sequence of the turbomachine based on the magnitude of the deflection.

* * * * *